Aug. 29, 1967   PAUL-CHARLES RIEGGER   3,338,530
WINDING AND UNWINDING MACHINE
Filed Jan. 21, 1965   3 Sheets-Sheet 1
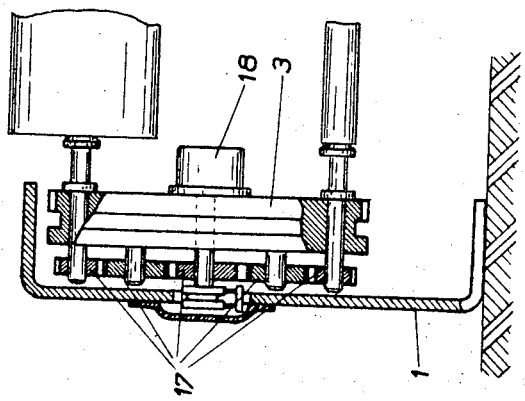
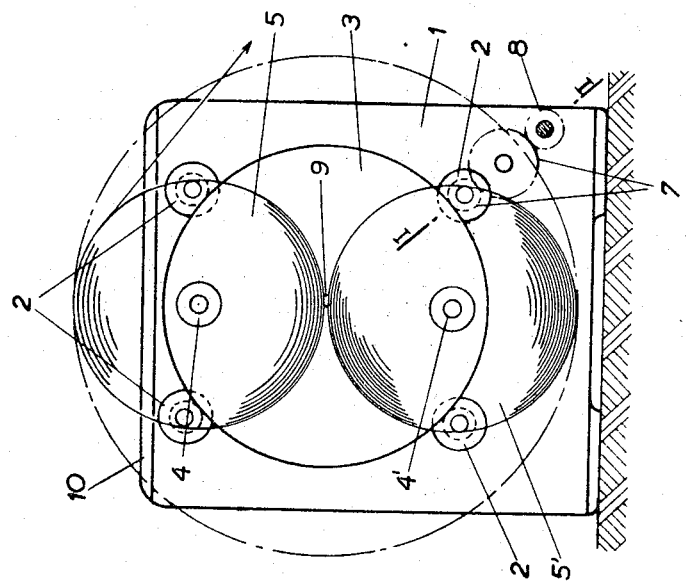

Aug. 29, 1967    PAUL-CHARLES RIEGGER    3,338,530
WINDING AND UNWINDING MACHINE
Filed Jan. 21, 1965                     3 Sheets-Sheet 2
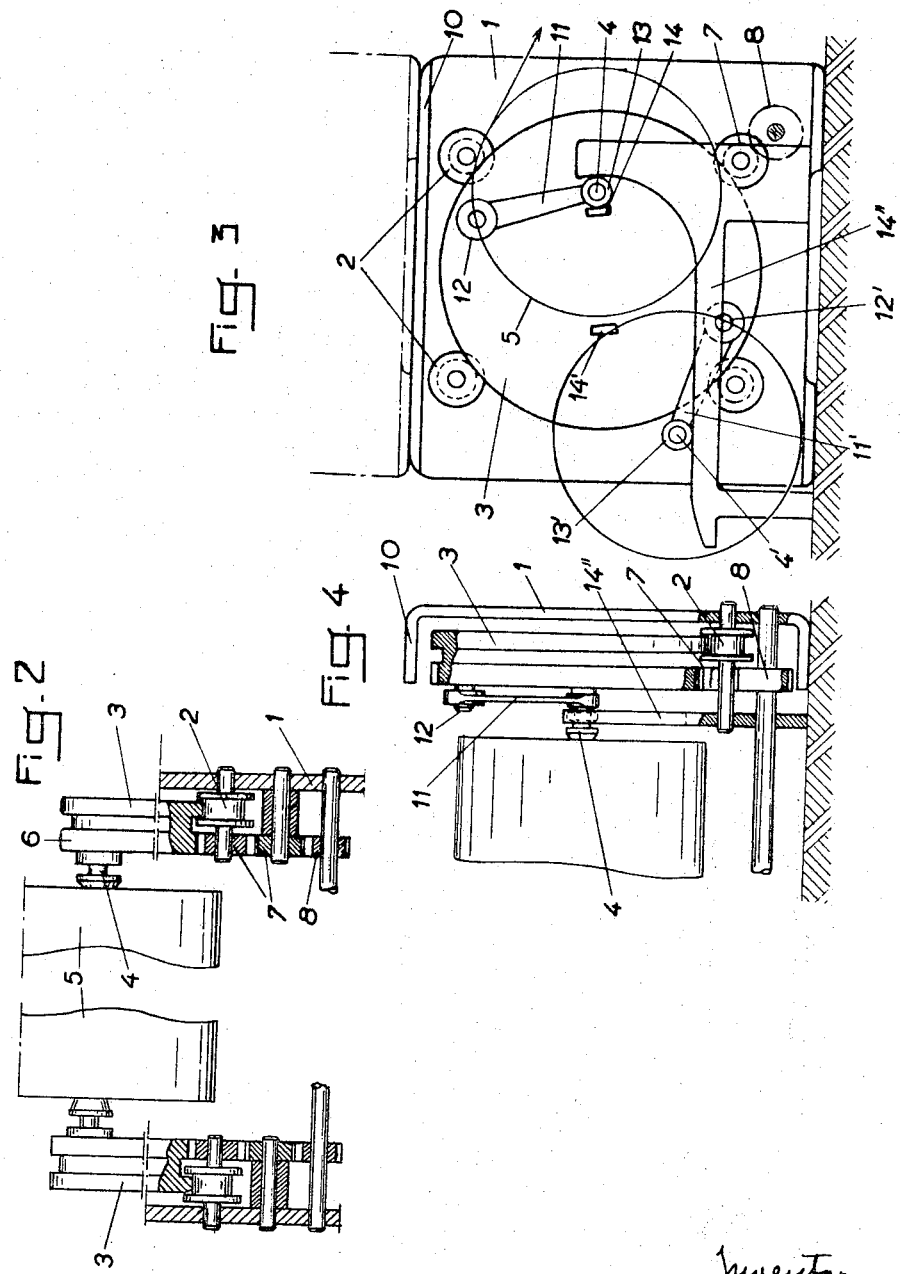

Aug. 29, 1967    PAUL-CHARLES RIEGGER    3,338,530
WINDING AND UNWINDING MACHINE

Filed Jan. 21, 1965    3 Sheets-Sheet 3

United States Patent Office 3,338,530
Patented Aug. 29, 1967

3,338,530
WINDING AND UNWINDING MACHINE
Paul-Charles Riegger, 7 Rue Ehrmann, Strasbourg,
Bas-Rhin, France
Filed Jan. 21, 1965, Ser. No. 427,033
Claims priority, application France, Jan. 25, 1964,
7,952
11 Claims. (Cl. 242—64)

The present invention relates to a machine for unwinding or winding strips of paper, cellulose films or other flexible materials, in general, and to such machine in which the spools, both those in the course of unwinding or winding and those in the course of waiting, are lodged in such manner that they can rotate freely in two bearing-carrier elements which can themselves be rotated in synchronism and are disposed symmetrically in relation to a vertical plane passing through the longitudinal axis of the machine and parallel with one another, in particular In winding machines known hitherto the bearing-carrier elements are supported either by a common shaft passing through the machine from side to side and terminating outside the machine with journals engaged in shaft supports, or simply by journals fixed in overhanging fashion on the shaft supports.

These known machines possess several drawbacks. The shaft passing through the machine and also extending between the two bearing-carrier elements, limits the diameter of the spools mounted on the elements. Furthermore this shaft and, in its absence, the journals replacing it, are subjected to the effects of bending and torsion forces exerted upon them by the weight of the elements which they have to support, and consequently are in danger of losing their parallel orientation, which is essential for ensuring proper unwinding and winding of the strips of material being worked. Moreover by reason of the fact that the shaft ends or journals protrude to the exterior of the machine and necessitate mounting to the installation, also outside the machine, of bearing supports or heads, the bulk of the machine is considerably increased and is disproportionate in relation to the spools mounted on the bearing-carrier elements.

It is one object of the present invention to provide a machine for winding or unwinding strips, wherein these disadvantages are remedied, and at the same time providing further advantages, such as an appreciable simplification of the machine and of its constituent parts.

It is another object of the present invention to provide a machine for winding or unwinding strips, comprising two bearing-carrier elements, which instead of being supported by a common shaft or by journals fixed in overhanging fashion on bearing supports disposed outside the machine, are supported and guided by a track upon which the bearing-carrier elements travel through the intermediary of a plurality of rollers or shoes which are integral either with the frame of the machine or with the elements themselves.

It is still another object of the present invention to provide a machine for winding or unwinding strips, comprising two bearing-carrier elements which can be given a synchronous rotational movement about a common or an imaginary axis passing through the center of the elements. This rotational movement is imparted by a speed-reduction mechanism, at least one of the elements of which can constitute a member, or by any other movement-transmission mechanism.

It is yet another object of the present invention to provide a machine for winding and unwinding strips, wherein the bearings of the bearing-carrier elements are fixed either directly upon the elements or indirectly through the intermediary of arms which are articulated upon the elements and each carry at least one roller which bears upon a guide rail provided for this purpose.

With these and other objects in view which will become apparent in the following detailed description, the present invention will be clearly understood in connection with the accompanying drawings, in which:

FIGURE 1 is a side elevation of a winding and unwinding and unwinding machine of the present invention with one side of the machine removed;

FIG. 2 is a fragmentary front elevation of the machine partially in section along the lines I—I of FIG. 1;

FIG. 3 is a side elevation of another winding and unwinding machine of the present invention with one side of the machine removed;

FIG. 4 is a fragmentary front elevation, partially in section, of the machine of FIG. 3;

FIG. 7 is a section along the lines VI—VI of FIG. 6.

Figure 5:
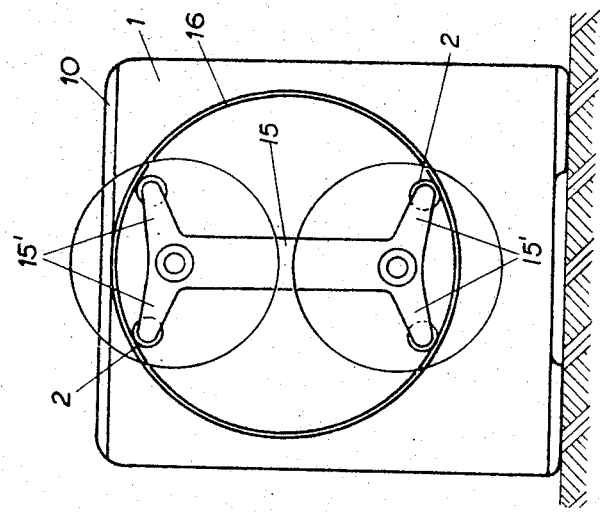
FIG. 5 is a side elevation of another embodiment of the present invention with one side of the machine removed.

Referring now to the drawings, and in particular to FIGS. 1 and 2, a winding or unwinding machine according to the present invention, comprises a frame 1 with two side pieces (FIG. 2), upon each of which there are secured a plurality of roller means such as grooved rollers 2 (four being illustrated in FIG. 1) supporting and guiding two bearing carrier plates or elements 3 at the periphery thereof, which preferably but not necessarily have a circular form, and which carry thereon bearings 4 and 4'. In the bearings 4 and 4' there are housed spindles or journals for reels 5 and 5', carrying strips of material thereon for winding and unwinding. The reels 5 and 5', bearings 4 and 4' and the spindles or journals constitute a reel means rotatably connected to the carrier plates 3.

The bearing carrier elements 3 are disposed parallel to one another and spaced such that the reels 5, 5', mounted between them, can rotate freely. The bearing carrier elements 3 are not connected together by any shaft, but could be so connected by properly distributed struts. Moreover, they can further be provided with an externally toothed rim 6 meshing with a speed reduction mechanism 7 and 8, the rim constituting the last member of this synchronizing mechanism. By this synchronizing mechanism, the two bearing carrier elements 3 can be driven to carry out a synchronous rotational movement about their common or imaginary axis 9. The frame 1 of the machine advantageously has a square shape and has a flange 10 covering the bearing carrier elements 3 with its toothed rim 6, thereby forming a protective casing for the carrier elements 3 and the rim 6. This shape of the frame permits a superimposition of any desired number of vertically stacked machines, as indicated in FIG. 3.

Instead of the roller means constituting the support and guide rollers 2, it is also within the scope of the present invention to utilize other roller means appropriate for the purpose to be fulfilled, such as skid members or the like.

Referring now again to the drawings, and more particularly to FIGS. 3 and 4, another embodiment of the present invention is shown which is distinguished from that which has just been described, essentially in that the bearings 4 and 4' of the spools 5 are not fixed directly upon the bearing carrier elements 3, but are so fixed indirectly through the intermediary of arms 11 and 11', pivotally joined at one end by bearings 12 and 12', respectively, to the bearing carrier elements 3. Each of the arms 11 and 11' also carries at the other end, in addition to the bearings 4 and 4', a reel support rollers 13 and 13', respectively, which, at a predetermined angular position of the bearing carrier elements 3, bears upon a guide rail 14" which may or may not be integral with the frame 1 of the machine. The predetermined angular position of the bearing carrier elements 3 is especially useful for changing spools, for example, when the machine is to be charged with a fresh reserve spool, this position being shown in FIG. 3. The guide rail 14" supports the entire weight of the spools. To prevent an improper return movement of the arms 11 and 11' with its respective spools 5, which movement could occur when the bearing carrier elements 3 in their rotational movement approach the loading position, stops 14 and 14' are provided on the bearing carrier elements 3.

This embodiment of the present invention has the advantage over the former embodiment of permitting the retraction of the spools at a low position between the bearing carrier elements 3 and consequently of further reducing the bulk of the machine.

Referring now again to the drawings, and more particularly to FIG. 5, still another embodiment is shown in which the support and guide rollers 2 are not fixed on the side pieces 1 of the frame of the machine, but instead on small forked arms 15' of a large arm 15 secured to the bearing carrier element, and roll inside, for example, either a bore 16 formed in the side pieces 1 of the frame or in a ring attached to the side pieces. The other elements are the same as those in the other embodiments.

Figure 6:
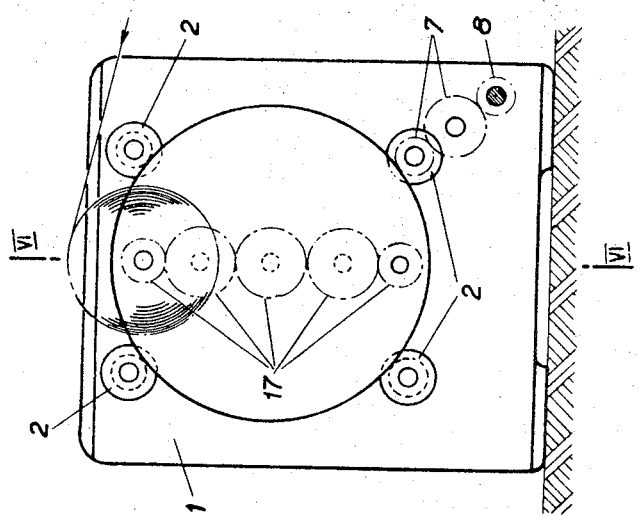
FIG. 6 is a side elevation of an embodiment comprising a toothed-wheel gear permitting the utilization of the machine as a winding machine, with one side of the machine removed.

FIGS. 6 and 7 show the addition of a toothed-wheel gearing 17 connected to the individual journals of the reels 5 and 5', which is driven, for example, by a small electric motor 18, thereby turning the reel 5 and 5', permitting the machine to also be utilized as a winding machine.

The unwinding and winding machine according to the present invention, while being of simple and robust construction, possesses minimum bulk and perfectly fulfills the purpose for which it is intended.

While I have disclosed several embodiments of the present invention, it is to be understood that these embodiments are given by example only and not in a limiting sense, the scope of the present invention being determined by the objects and the claims.

I claim:
1. A winding and unwinding machine comprising:
    a frame including two parallel and spaced side pieces,
    a carrier plate disposed adjacent each side piece between said side pieces,
    said carrier plates being parallel to and symmetrically oriented relative to each other and defining a common axis,
    each of said carrier plates and said adjacent side pieces constituting members,
    a plurality of roller means fixed to one of said members and movably connected to and concentrically arranged relative to the other one of said members for exclusively supporting and rotatably guiding said carrier plate on and relative to said adjacent side piece, and
    reel means for winding and unwinding heavy webs thereon rotatably connected operatively to and between said carrier plates.
2. The winding and unwinding machine, as set forth in claim 1, further comprising:
    means for synchronizing the rotation of said carrier plates about said common axis.
3. The winding and unwinding machine, as set forth in claim 2, wherein
    said synchronizing means includes a speed reduction mechanism.
4. The winding and unwinding machine, as set forth in claim 2, wherein
    said synchronizing means includes a rim gear on the periphery of said carrier plates, and
    gear means operatively connected to said rim gears of said carrier plates.
5. The winding and unwinding machine, as set forth in claim 1, wherein
    said reel means are directly rotatably connected to said carrier plates.
6. The winding and unwinding machine, as set forth in claim 1, further comprising:
    an arm pivotally connected at one end to each of said carrier plates,
    said reel means rotatably connected to the other end of said arm,
    a reel support roller means operatively connected to said other end of said arm,
    a guide rail rigidly mounted adjacent and relative to said frame and disposed in the path of said reel support roller means during rotation of said carrier plates, and
    said guide rail including a substantially horizontal portion for carrying the weight of said reel means.
7. The winding and unwinding machine, as set forth in claim 6, further comprising:
    stops affixed to said carrier plate and positioned thereon adjacent one end of said guide rail and spaced to pass therebetween said reel support roller means when said carrier plates rotate.
8. The winding and unwinding machine, as set forth in claim 1 wherein
    said roller means are fixed to said side pieces, and
    said carrier plate includes a track along which said roller means is movably connected and along which said roller means encirclingly moves relative thereto.
9. The winding and unwinding machine, as set forth in claim 8, wherein
    said track being the periphery of said carrier plate, and
    said roller means comprising grooved rollers in which said periphery of said carrier plate is disposed.
10. The winding and unwinding machine, as set forth in claim 1, wherein
    said roller means are fixed to said carrier plates, and
    said side pieces including a track along which said roller means is movably connected and along which said roller means moves surrounding said side pieces.
11. The winding and unwinding machine, as set forth in claim 1, further comprising:
    a motor,
    a tooth-wheel gearing means connected to said motor and operatively connected to said reel means for independently rotating said reel means relative to said carrier plate.

References Cited

UNITED STATES PATENTS

| | | | |
|---|---|---|---|
| 444,818 | 1/1891 | Cornwell | 242—64 |
| 1,587,713 | 6/1926 | Franzen | 211—164 X |
| 2,060,360 | 11/1936 | Wood | 242—64 |
| 3,010,668 | 11/1961 | McPherson et al. | 242—64 X |

FRANK J. COHEN, *Primary Examiner.*

G. F. MAUTZ, *Assistant Examiner.*